(12) United States Patent
Iwazaki et al.

(10) Patent No.: US 7,477,951 B2
(45) Date of Patent: Jan. 13, 2009

(54) SERVO CONTROLLER AND CONTROL METHOD USING THE SAME

(75) Inventors: Katsuhiko Iwazaki, Namazu (JP); Seiji Kawakami, Susono (JP); Hiroaki Kataoka, Susono (JP); Chumsamutr Rattapon, Susono (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 304 days.

(21) Appl. No.: 11/474,440

(22) Filed: Jun. 26, 2006

(65) Prior Publication Data

US 2007/0185594 A1 Aug. 9, 2007

(30) Foreign Application Priority Data

Jun. 27, 2005 (JP) ............................. 2005-187057

(51) Int. Cl.
*G05B 13/02* (2006.01)
(52) U.S. Cl. ...................................................... 700/42
(58) Field of Classification Search .................. 700/13, 700/32, 42, 46, 54, 69, 302; 701/4, 8, 41, 701/42
See application file for complete search history.

(56) References Cited

U.S. PATENT DOCUMENTS

| 4,059,751 | A | 11/1977 | Eriksson |
| 6,374,167 | B2 * | 4/2002 | Iwazaki ........................ 701/41 |
| 7,069,129 | B2 | 6/2006 | Iwazaki et al. |
| 7,263,420 | B2 * | 8/2007 | Tanaka et al. .................. 701/36 |
| 2005/0267684 | A1 | 12/2005 | Kawakami et al. |
| 2005/0270145 | A1 | 12/2005 | Kataoka et al. |
| 2005/0273234 | A1 | 12/2005 | Rattapon et al. |
| 2005/0273261 | A1 | 12/2005 | Niwa et al. |
| 2005/0273262 | A1 | 12/2005 | Kawakami et al. |
| 2005/0278096 | A1 | 12/2005 | Iwazaki et al. |

FOREIGN PATENT DOCUMENTS

| DE | 3636 140 A1 | 4/1988 |
| DE | 3636 141 A1 | 4/1988 |
| DE | 198 48 473 A1 | 6/1999 |
| JP | A-04-007602 | 1/1992 |
| JP | A-11-208494 | 8/1999 |
| JP | A 2001-001923 | 1/2001 |

OTHER PUBLICATIONS

Wang et al.; "Robustly Stabilizing PID Controllers for Car Steering Systems"; 1998; Procedings of the American Control Conference; pp. 41-42.*

* cited by examiner

*Primary Examiner*—Albert DeCady
*Assistant Examiner*—Chad Rapp
(74) *Attorney, Agent, or Firm*—Oliff & Berridge, PLC

(57) ABSTRACT

When an integral calculation of a physical quantity representing a state of a controlled system is performed, two integral calculations, that is, a positive-integral calculation and a negative-integral calculation are performed. In this way, differentiated information can be obtained, depending on the control conditions. A selection of which one of the integral value obtained by the positive-integral calculation and the integral value obtained by the negative-integral calculation is used, is made on the basis of an actual control value and a desired control value when control is performed so that a value representing the state of the controlled system becomes equal to the desired control value. In this way, a control parameter which has been judged to include a phase delay is removed. Thus, the phase delay in the overall control can be suppressed, and an appropriate steering assist control can be performed, for example.

18 Claims, 9 Drawing Sheets

SERVO CONTROLLER AND CONTROL METHOD USING THE SAME

INCORPORATION BY REFERENCE

The disclosure of Japanese Patent Application No. 2005-187057 filed on Jun. 27, 2005, including the specification, drawings and abstract is incorporated herein by reference in its entirety.

BACKGROUND OF THE INVENTION

1. Field of the Invention

The present invention relates to a servo controller and a control method using the servo controller, and, in particular, to a servo controller which is used to assist steering operation of a vehicle, and a control method using the servo controller.

2. Description of the Related Art

In the field of servo control, technologies using integrators to eliminate the steady-state error caused by disturbance have been proposed (see Japanese Patent Application Publication No. 2001-1923, for example). The technology described in Japanese Patent Application Publication No. 2001-1923 relates to a vehicular steering assist system, which is an example of the servo control. In this document, the precision of lane keeping control, for example, is improved by calculating, by integral calculation, a value representing the influence exerted on a vehicle due to disturbance, and controlling the steering assist force of the vehicle according to the integral value.

However, if a process for eliminating the steady-state error caused by disturbance is performed using an integrator in this way, a phase delay due to the characteristics intrinsic to integral calculation is inevitably caused. Such a phase delay can result in a control result lacking in stability, depending on the behavior of the disturbance. For example, there is a possibility that, when there is no disturbance, low frequency oscillations occur in controlled variables. If there is a disturbance, and the direction thereof is inverted, the integral value which is calculated to obtain a correct control result may increase an influence of the disturbance.

For the purpose of solving such problems, it is possible to adopt a method used to achieve stable control by resetting an integral value of a parameter to zero when the direction of the slope of the parameter to be integrated is inverted. With this method, since quick response can be made even when there is a disturbance and the direction thereof is inverted, it is possible to maintain the stability of control. When a steady disturbance is being caused, however, oscillations occur in controlled variables, and, therefore, there is a problem that the stability of control cannot be maintained.

It is also possible to adopt a method used to achieve stable control by resetting an integral value of a parameter to zero when the sign of the parameter to be integrated is inverted. With this method, since the steady-state error caused by disturbance is stably eliminated by an integrator even when steady disturbances are being caused, it is possible to achieve a good control result. There still remains a problem, however, that, when the direction of the disturbance is inverted, the time from when the parameter is reset to when a stable control is achieved, is excessively long, and the disturbance cannot be dealt with during the transition period.

SUMMARY OF THE INVENTION

In consideration of the above problems, as an exemplary embodiment of the present invention, provided is a servo controller which can minimize the influence of disturbance when servo control using integral calculation is performed.

Accordingly, provided is a servo controller which repeatedly performs a predetermined control process, and controls a state of a controlled system on the basis of a result of performing the control process. The servo controller includes a detector and a control unit. The detector detects the state of the controlled system. The control unit performs a positive-integral calculation in which an integral calculation of a physical quantity representing the state of the controlled system detected by the detector is performed, and in which, when a resulting integral value is positive, the integral calculation is continued, and a negative-integral calculation in which an integral calculation of the physical quantity representing the state of the controlled system detected by the detector is performed, and in which, when a resulting integral value is negative, the integral calculation is continued. In addition, the control unit makes a selection of which one of the positive-integral calculation and the negative-integral calculation is used when control is performed so that a value representing the state of the controlled system becomes equal to a desired control value. The control unit performs control so that the value representing the state of the controlled system becomes equal to the desired control value, using one of the positive-integral calculation and the negative-integral calculation, which has been selected.

According to another aspect of the present invention, provided is a control method using a servo controller which repeatedly performs a predetermined control process, and controls a state of a controlled system on the basis of a result of performing the control process. The control method includes the steps of detecting the state of the controlled system; performing a positive-integral calculation in which performed is an integral calculation of a physical quantity representing the state of the controlled system detected, and, when a resulting integral value is positive, the integral calculation is continued; performing a negative-integral calculation in which performed is an integral calculation of the physical quantity representing the state of the controlled system detected, and, when a resulting integral value is negative, the integral calculation is continued; making a selection of which one of the positive-integral calculation and the negative-integral calculation is used when control is performed so that a value representing the state of the controlled system becomes equal to a desired control value; and performing control so that the value representing the state of the controlled system becomes equal to the desired control value, using one of the integral calculations, which has been selected.

According to the servo controller and the control method using the servo controller as described above, the integral calculation of the detected physical quantity is carried out in the positive-integral calculation and the negative-integral calculation in a shared manner. With regard to the positive-integral calculation, for example, the integral calculation in the next control process is performed if the integral value obtained in the preceding control process is positive. On the other hand, in the negative-integral calculation, the integral calculation in the next control process is performed if the integral value obtained in the preceding control process is negative. In this way, differentiated information can be obtained, depending on the sign of the integral value, that is, the control conditions.

When control is performed so that the value representing the state of the controlled system becomes equal to the desired control value, the selection of which one of the positive-integral calculation and the negative-integral calculation is used, may be made on the basis of an actual control value and the desired control value. For example, when a difference between the actual control value and the desired control value is positive, the integral value calculated by the positive-integral calculation is selected as the control parameter which is used in the subsequent process. On the other hand, when the difference is negative, the integral value calculated by the negative-integral calculation is selected as the control parameter which is used in the subsequent process At this time, the integral value which has not been selected is reset to zero, so that the integral value is surely removed. In this way, even when a steady disturbance is being caused, one of the calculation results obtained by the two integral calculations, which is more appropriate to the control conditions, is selected, so that it is made possible to stably remove the influence of the disturbance.

According to another aspect of the present invention, provided is a servo controller for assisting steering operation of a vehicle so that the vehicle travels keeping a predetermined-position in a travel lane. The servo controller includes a detector and a control unit. The detector detects an offset, which is a deviation of a position of the vehicle from a desired position in a travel lane. The control unit performs a positive-integral calculation in which an integral calculation of the offset detected by the detector is performed, and in which, when a resulting offset integral value is positive, the integral calculation is continued, and a negative-integral calculation in which an integral calculation of the offset detected by the detector is performed, and in which, when a resulting offset integral value is negative, the integral calculation is continued. In addition, the control unit makes a selection of which one of the positive-integral calculation and the negative-integral calculation is used when control is performed so that the position of the vehicle in the travel lane coincides with the desired position The control unit performs control so that the position of the vehicle in the travel lane coincides with the desired position, using one of the positive-integral calculation and the negative-integral calculation, which has been selected.

According to another aspect of the present invention, provided is a control method using a servo controller for assisting steering operation of a vehicle so that the vehicle travels keeping a predetermined position in a travel lane. The control method includes the steps of: detecting an offset, which is a deviation of a position of the vehicle from a desired position in the travel lane; performing a positive-integral calculation in which an integral calculation of the offset detected by the detector is performed, and in which, when a resulting offset integral value is positive, the integral calculation is continued; performing a negative-integral calculation in which an integral calculation of the offset detected by the detector is performed, and in which, when a resulting offset integral value is negative, the integral calculation is continued; making a selection of which one of the positive-integral calculation and the negative-integral calculation is used when control is performed so that the position of the vehicle in the travel lane coincides with the desired position; and performing control so that the position of the vehicle in the travel lane coincides with the desired position, using one of the positive-integral calculation and the negative-integral calculation, which has been selected.

According to the servo controller and the control method using the servo controller as described above, the servo controller can be used as a vehicular steering assist system for assisting steering operation of a vehicle so that the vehicle travels keeping a predetermined position in a travel lane. Accordingly, in the vehicular steering assist system, the influence due to the disturbance caused by steering friction and others is minimized, and it is made possible to perform an appropriate steering assist control.

With the present invention, it is possible to minimize the influence due to disturbance when servo control using integral calculation is performed.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
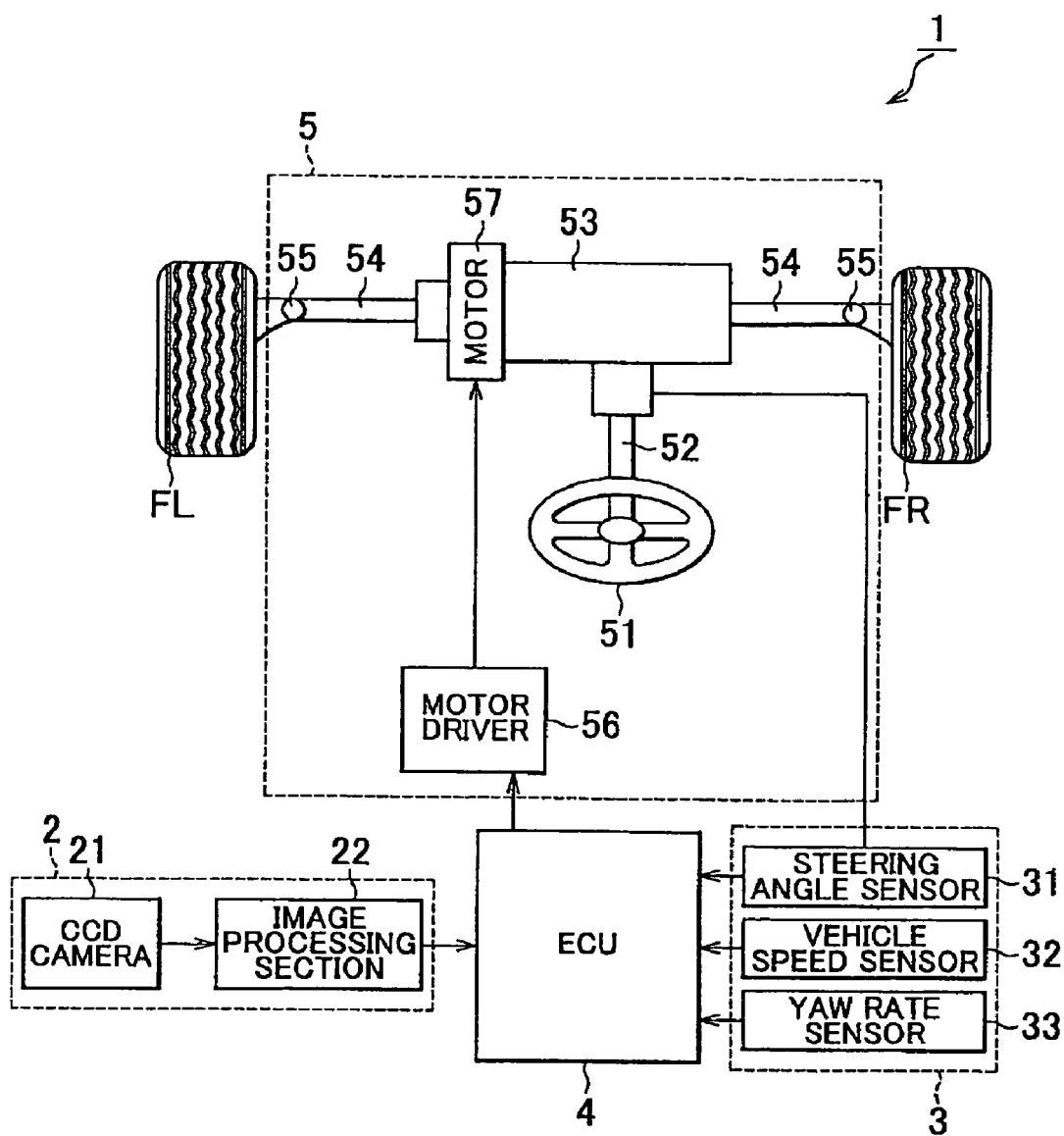
FIG. 1 is a schematic configuration diagram of a servo controller according to an embodiment of the present invention.

In the following description and the accompanying drawings, the present invention will be described in more detail with reference to an exemplary embodiment. Detailed description will be given below of a case where a servo controller of the present invention operates as a vehicular steering assist system, which is an example of a preferred embodiment of the servo controller according to the present invention, with reference to the accompanying drawings. It should be noted that, in the description of the drawings, the same elements are denoted by the same reference numeral and redundant description will thus be omitted.

Figure 2:
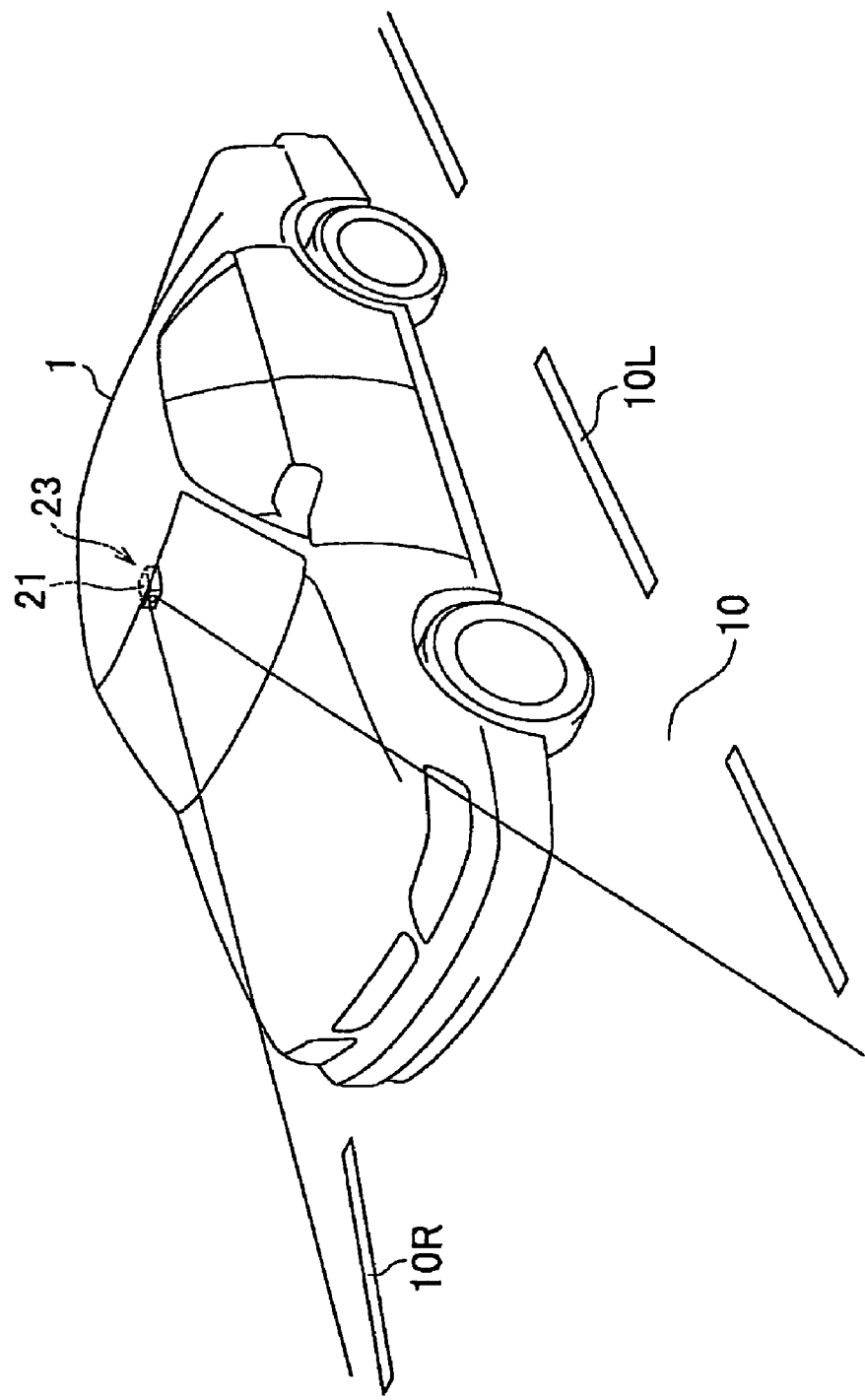
FIG. 2 is a diagram for explaining a situation in which an image data of a travel lane 10 is acquired.
Figure 3:
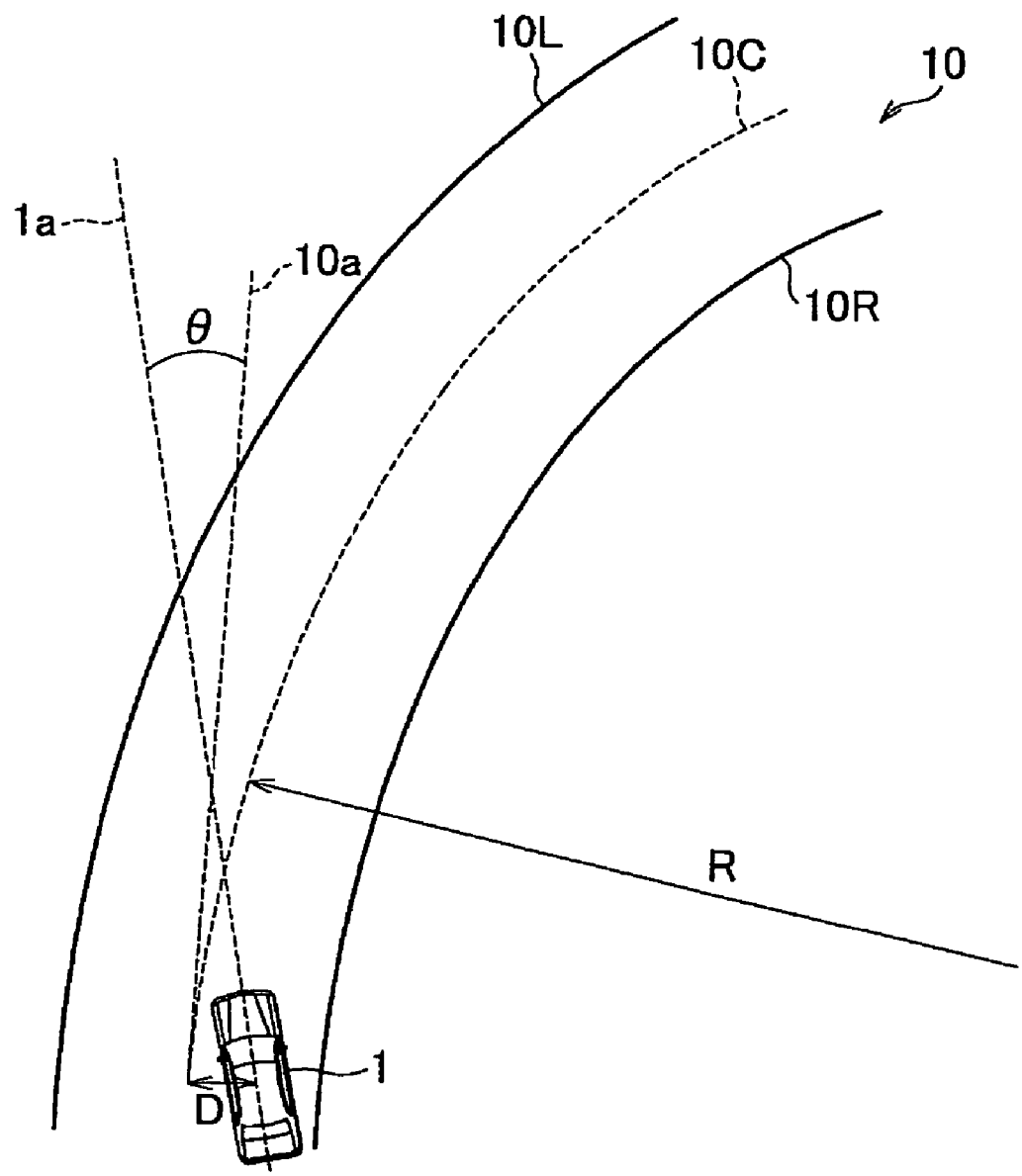
FIG. 3 is a diagram for explaining various road parameters of the travel lane 10.

First of all, detailed description will be given of a configuration of a vehicle 1 including the steering assist system of this embodiment according to the present invention with reference to FIGS. 1 to 3. FIG. 1 is a schematic configuration diagram of the steering assist system (i.e. the servo controller) of this embodiment. FIG. 2 is a diagram for explaining a situation in which an imaging unit 2 mounted on the vehicle 1 acquires image data of a travel lane 10. FIG. 3 is a diagram for explaining various road parameters and travel parameters given when the vehicle 1 travels in the travel lane 10.

As shown in FIG. 1, the vehicle 1 includes: the imaging unit 2 for acquiring the road parameters and the travel parameters, such as a curve radius, an offset and a yaw angle, from the image data obtained by imaging a front area of the travel lane 10; a sensor portion 3 for sensing the travel parameters, such as a steering angle, traveling speed and a yaw rate, of the vehicle 1; an ECU (Electrical Control Unit) 4 which receives the various road parameters and travel parameters from the imaging unit 2 and the sensor portion 3 to perform steering assist control (lane keeping control) of the vehicle; and a steering mechanism 5 for steering wheels FR and FL according to a steering control signal supplied from the ECU 4. The components will be explained below in more detail.

The imaging unit 2 includes a CCD camera 21, and an image processing section 22. As shown in FIG. 2, the CCD camera 21 is incorporated in an inside rear view mirror 23, for example. The CCD camera 21 acquires the image data of an area ahead of the vehicle 1, in particular, the image data of an area of the travel lane 10 around the vehicle 1. As the imaging device, devices other than the CCD camera 21, such as a CMOS camera, may be used. The CCD camera 21 converts the acquired image data to digital image data by AD (Analog to Digital) conversion, and outputs the digital image data to the image processing section 22.

The image processing section 22 performs image recognition processing on the image data supplied from the CCD camera 21, and recognizes a pair of white lines (lane division lines) 10R and 10L drawn on the road on which the vehicle 1 travels, thereby detecting the travel lane 10. In the image data acquired via the CCD camera 21, the difference between the brightness of the road, and the brightness of the white lines 10R and 10L is large. For this reason, the white lines 10R and 10L defining the travel lane 10 can be relatively easily detected by edge detection and the like, and are therefore useful to detect the travel lane 10 ahead of the vehicle 1.

As shown in FIG. 3, the image processing section 22 detects the curve radius R of a front area of the travel lane 10, the offset D of the vehicle 1 with respect to the travel lane 10 (a lateral offset between the center of gravity of the vehicle 1, and a tangent 10a to a center line 10C of the travel lane 10 at a point corresponding to the center of gravity of the vehicle), and the yaw angle θ (an angle between the central axis 1a extending in the longitudinal direction of the vehicle 1, and the tangent 10a to the center line 10C of the travel lane 10 at the point corresponding to the center of gravity of the vehicle) by performing a series of calculations on the basis of the detected travel lane 10. The image processing section 22 then outputs the detection result to the ECU 4. Each of the curve radius R, the offset D and the yaw angle θ can have either a positive value or a negative value, and the sign thereof indicates a direction. In this embodiment, the right side and the left side of the central axis 1a extending in the longitudinal direction of the vehicle 1 are represented by negative values, and positive values, respectively. With regard to the method of detecting the curve radius R, the offset D, and the yaw angle θ on the basis of the image data in this way, publicly known methods can be used.

As shown in FIG. 1, the sensor portion 3 includes a steering angle sensor 31, vehicle speed sensors 32, and a yaw rate sensor 33. The steering angle sensor 31 outputs the steering angle of the vehicle 1 to the ECU 4. In this embodiment, the steeling angle sensor 31 is connected with a steering wheel 51 or a steering shaft 52 shown in FIG. 1. The steering angle sensor 31 detects the steering angle of the steering wheel 51, and outputs the detection result to the ECU 4. The vehicle speed sensors 32 detect the traveling speed of the vehicle 1 by detecting the rotational speed of the wheels of the vehicle 1, for example. In this embodiment, the vehicle speed sensors 32 are attached to the right and left front wheels FR and FL shown in FIG. 1, each generating a pulse signal with a frequency corresponding to the rotational speed of the wheel. The vehicle speed sensor 32 outputs the pulse signal to the ECU 4. The yaw rate sensor 33 is disposed near the center of gravity of the vehicle 1. The yaw rate sensor 33 detects the yaw rate about a vertical axis passing through the center of gravity, and outputs the detection signal to the ECU 4.

In this way, the various signals outputted from the sensor portion 3 are supplied to the ECU 4 connected to the sensor portion 3. The ECU 4 detects the steering angle on the basis of the output signal from the steering angle sensor 31, and detects the vehicle speed on the basis of the output signal from the vehicle speed sensor 32. The sensor portion 3 may include a navigation system (not shown). In this case, the navigation system utilizes GPS (Global Positioning System) to detect the road parameters in an area ahead of the vehicle 1 which area is out of the field of view of the CCD camera 21. The ECU 4 may refer to the road parameters detected by the navigation system when detecting the various data on the basis of the detection signals from the sensor portion 3.

As shown in FIG. 1, the steering mechanism 5 includes the steering wheel 51, the steering shaft 52, a steering gear box 53, a rack bar 54, knuckle arms 55, a motor driver 56, and a motor 57. The steering wheel 51 is disposed in the vehicle compartment of the vehicle 1, and steers the wheels FR and FL when operated by a driver. The steering wheel 51 is fixed to one end of the steering shaft 52. The steering shaft 52 rotates with the rotation of the steering wheel 51.

The rack bar 54 is coupled to the other end of the steering shaft 52 via the steering gear box 53. The steering gear box 53 has a function of converting the rotational motion of the steering shaft 52 into a linear motion in the axis direction of the rack bar 54. Both ends of the rack bar 54 are coupled to hub carriers (not shown) of the wheels FR and FL via the knuckle arms 55. Due to such a construction, rotation of the steering wheel 51 allows the wheels FR and FL to be steered via the steering shaft 52, the steering gear box 53, the rack bar 54 and the knuckle arms 55.

The motor driver 56 is connected to the ECU 4. The ECU 4 supplies a steering control signal to the motor driver 56 according to the logic described later. The motor driver 56 supplies driving electric current to the motor 57 disposed in the steering gear box 53 according to the steering control signal to drive the motor 57. The motor 57 applies, to the rack bar 54, a steering torque corresponding to the driving electric current supplied by the motor driver 56. Although not shown, a ball screw groove is formed in part of an outer surface of the rack bar 54, and a ball nut having, in an inner surface thereof, a ball screw groove corresponding to the above ball screw groove is fixed to a rotor of the motor 57. A plurality of bearing balls are accommodated between the pair of ball screw grooves. Accordingly, driving the motor 57 causes the rotor to rotate, whereby it is possible to control the linear motion of the rack bar 54 in the axis direction thereof, that is, the steering of the wheels.

Figure 4:
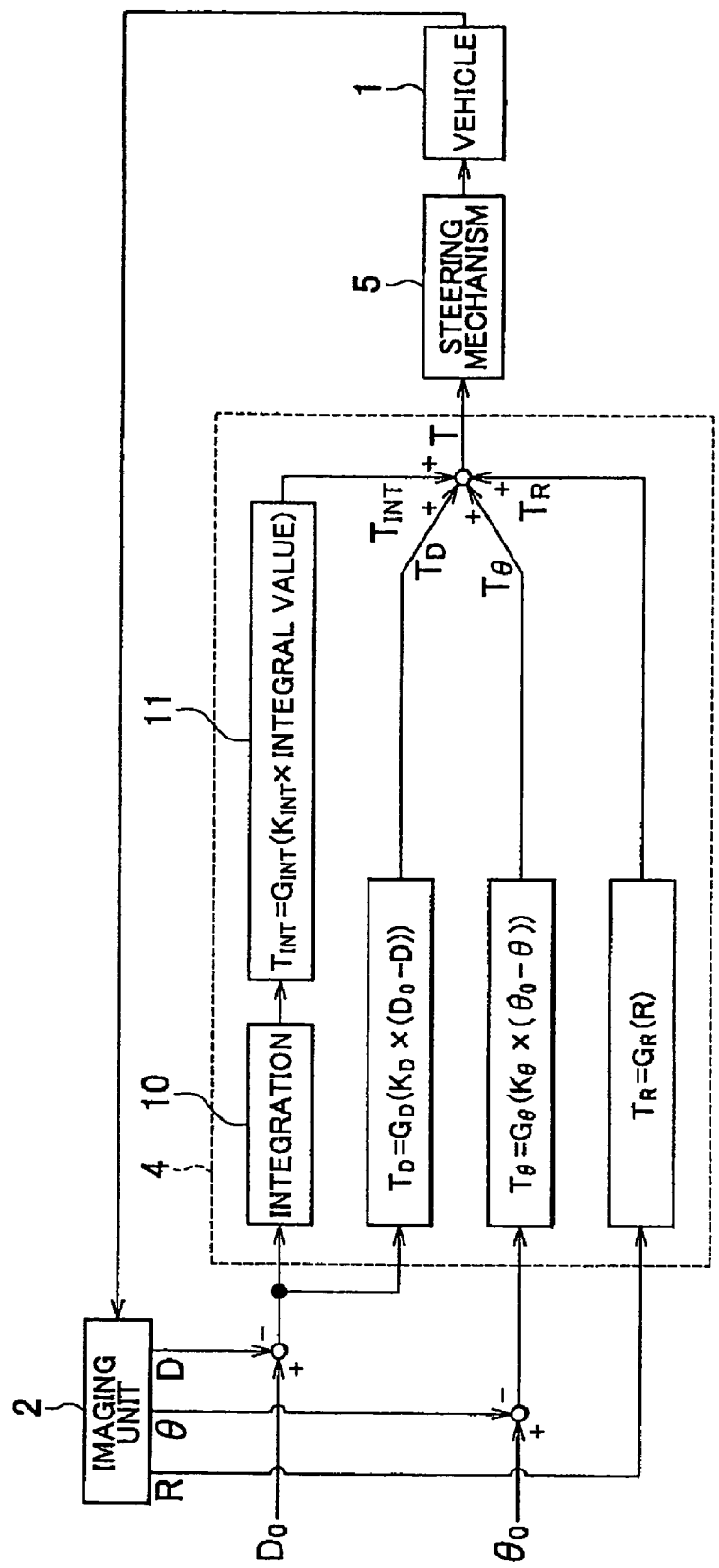
FIG. 4 is a block diagram showing an operation of the servo controller show in FIG. 1.

Next, specific description will be given of the steering assist control performed by the ECU 4 on the basis of the road parameters and the travel parameters supplied from the imaging unit 2 and the sensor portion 3, with reference to FIG. 4. FIG. 4 is a block diagram showing an operation performed when the ECU 4 calculates the steering control signal, and the steering torque T corresponding to the steering control signal is then applied to the wheels FR and FL via the steering mechanism 5. The offset and the yaw angle which are desired values used for allowing the vehicle to travel properly in the travel lane 10 are set at a desired offset $D_0$, and a desired yaw angle $\theta_0$ in advance. In this embodiment, the center line 10C of the travel lane 10 shown in FIG. 3 is the desired position of the steering control, and both values of the desired offset $D_0$, and the desired yaw angle $\theta_0$ at the desired position are set at zero.

First, the CCD camera 21 of the imaging unit 2 captures the image of an area ahead of the vehicle 1. The image processing section 22 calculates the curve radius R of the travel lane 10, as well as the offset D and the yaw angle θ of the vehicle 1 on the basis of the captured image. The curve radius R can be geometrically derived from the captured image. As a method of geometrically deriving the curve radius R, one in which the lateral shift of the white line in an area forward of the vehicle 1 by a predetermined distance, or the inclination of the tangent to the white line at a point forward of the vehicle 1 by a predetermined distance is referred to, may be employed.

The steering torque T applied in the steering mechanism 5 is calculated using the following equation (1):

$$T = T_R + T_\theta + T_D + T_{INT} \quad (1)$$

wherein $T_R$ is a steering torque required to allow the vehicle 1 to turn along the travel lane 10 (curve). As shown by the following equation (2), for example, the steering torque $T_R$ is calculated using a certain torque calculation function $G_R$ in which the curve radius R supplied from the imaging unit 2 is used as a variable.

$$T_R = G_R(R) \quad (2)$$

In the equation (1), $T_\theta$ is a steering torque for compensating for the yaw angle $\theta$. The steering torque $T_\theta$ is calculated using a certain torque calculation function $G_\theta$ using, as a variable, a value obtained by multiplying the difference $\Delta\theta$ between the desired yaw angle $\theta_0$ and the yaw angle $\theta$ supplied from the imaging unit 2, that is, $(\theta_0 - \theta)$ by a coefficient $K_\theta$, as shown by the following equation (3), for example. In this embodiment, the desired yaw angle $\theta_0$ is zero, and the yaw angle difference $\Delta\theta$ is therefore $(-\theta)$.

$$T_\theta = G_\theta(K_\theta \times (\theta_0 - \theta)) \quad (3)$$

In the equation (1), $T_D$ is a steering torque for compensating for the offset D. The steering torque $T_D$ is calculated using a certain torque calculation function $G_D$ using, as a variable, a value obtained by multiplying the difference $\Delta D$ between the desired offset $D_0$ and the offset D supplied from the imaging unit 2, that is, $(D_0 - D)$ by a coefficient $K_D$, as shown by the following equation (4), for example. In this embodiment, the desired offset $D_0$ is zero, and the offset difference $\Delta D$ is therefore $(-D)$.

$$T_D = G_D(K_D \times (D_0 - D)) \quad (4)$$

In the equation (1), $T_{INT}$ is a steering torque determined by integral calculation performed by the ECU 4 to eliminate the steady-state error caused by disturbance. The steering torque $T_{INT}$ is calculated using a certain torque calculation function $G_{INT}$ using, as a variable, a value obtained by multiplying the integral value of the offset D by a coefficient $K_{INT}$, as shown by the following equation (5), for example.

$$T_{INT} = G_{INT}(K_{INT} \times \text{integral value}) \quad (5)$$

The four steering torques $T_R$, $T_\theta$, $T_D$ and $T_{INT}$ thus calculated are summed up as shown by the equation (1), whereby the steering torque T is calculated.

However, if a process relying on integral calculation is performed to eliminate the steady-state error caused by disturbance as in the case of the equation (5), a phase delay due to the characteristics intrinsic to integral calculation is inevitably caused. Such a phase delay can result in a control result lacking in stability, depending on the behavior of the disturbance. For this reason, in this embodiment, in order to minimize the influence of the phase delay, which is caused while integral calculation is performed, on the overall steering assist control, the influence of the phase delay is minimized by performing two integral calculations, and thereafter selecting the best calculation result appropriate to the control conditions as the final control parameter. Detailed description will be given below of an operation of such a steering assist system of this embodiment with reference to the flow charts shown in FIGS. 5A, 5B and 6A, 6B.

Figure 5A:
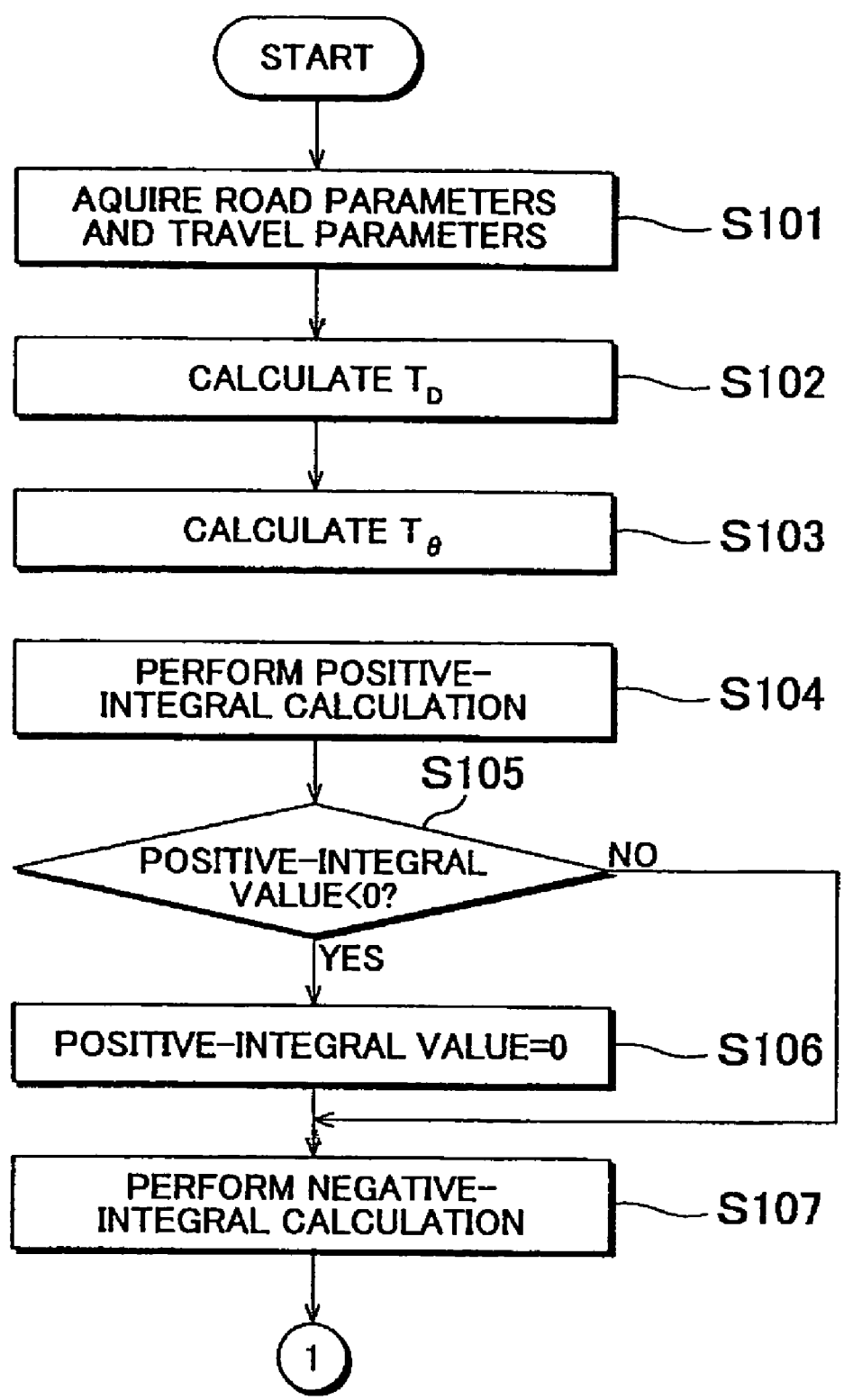
FIGS. 5A and 5B are flow charts showing an operation of the servo controller shown in FIG. 1.
Figure 5B:
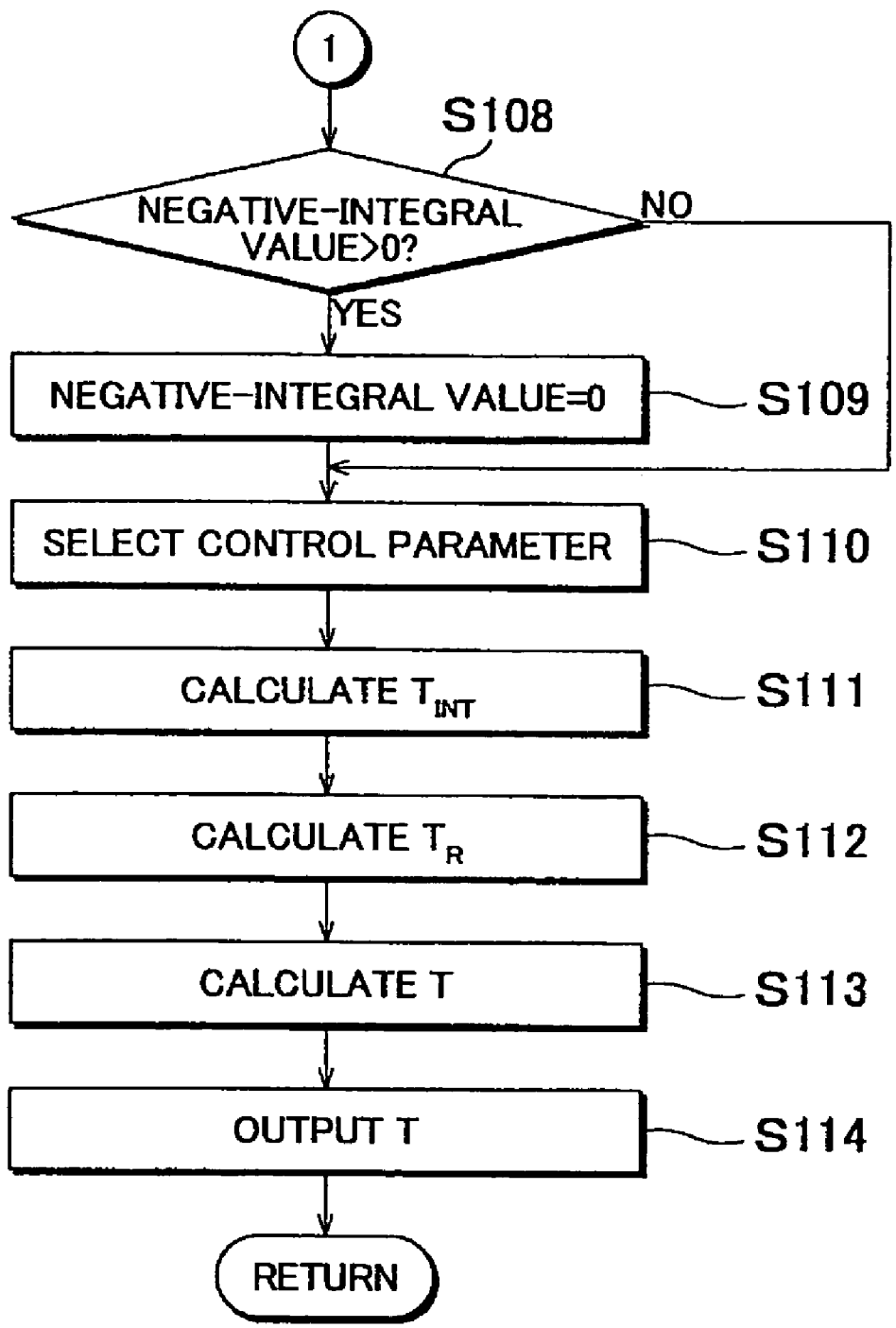

FIGS. 5A and 5B are flow charts showing a basic operation of the servo controller of this embodiment. A control process shown in FIGS. 5A and 5B are repeatedly performed by the ECU 4, for example. First of all, the road parameters and the travel parameters, such as the curve radius R of the travel lane 10, as well as the offset D and the yaw angle $\theta$ of the vehicle 1, are acquired on the basis of the image of the travel lane 10 in which the vehicle travels. As the image used in this process, used is one which is obtained by receiving the captured-image signal from the CCD camera 21. The image processing section 22 performs a process of acquiring the road parameters and a process of acquiring the travel parameters on the basis of the image (S101).

The steering torque $T_D$ for compensating for the offset D is calculated using the above equation (4), for example (S102). Subsequently, the steering torque $T_\theta$ for compensating for the yaw angle $\theta$ is calculated using the above equation (3), for example (S103).

Next, the integral calculation of the offset D is performed. This integral calculation is broadly divided into a positive-integral calculation (S104 to S106), and a negative-integral calculation (S107 to S109) as described in detail below.

First, the positive-integral calculation is performed (S104). In this embodiment, the left side of the central axis 1a extending in the longitudinal direction of the vehicle 1 is represented by positive values, and, therefore, the positive-integral calculation is performed on the left side of the central axis 1a. In this embodiment, an integral value of the offset D (hereinafter referred to as "the positive-integral value") which value is a result of the positive-integral calculation can be obtained by adding the current offset difference $\Delta D$ to the positive-integral value obtained in the preceding control process.

Subsequently, the sign of the positive-integral value is determined (S105). If it is determined that the sign of the positive-integral value is negative in step S105, the positive-integral value obtained in step S104 is reset to zero (S106). In the positive-integral calculation process in step S104, information which is more appropriate to the control conditions can be obtained when the integral value of the offset D is positive, as compared to when the integral value of the offset D is zero or negative. Since, in the positive-integral calculation process, the calculation is performed (that is, the integral value is not reset) while the integral value is zero or positive, the integral value obtained while the integral value is negative does not affect the calculation result. Accordingly, if it is determined that the sign of the positive-integral value is negative in step S105, by resetting the positive-integral value to zero, it is made possible to minimize the influence of the information which is not appropriate to the control conditions on the overall control. In this way, it is possible to stably minimize the influence due to disturbance while a steady disturbance is being caused. On the other hand, if it is determined that the positive-integral value is zero or positive in step S105, the positive-integral value is not reset, and the process proceeds to step S107.

Next, the negative-integral calculation is performed (S107). In this embodiment, the right side of the central axis 1a extending in the longitudinal direction of the vehicle 1 is represented by negative values, and, therefore, the negative-integral calculation is performed on the right side of the central axis 1a. In this embodiment, an integral value of the offset D (hereinafter referred to as "the negative-integral value") which value is a result of the negative-integral calculation can be obtained by adding the current offset difference $\Delta D$ to the negative-integral value obtained in the preceding control process.

Subsequently, the sign of the negative-integral value is determined (S108). If it is determined that the sign of the negative-integral value is positive in step S108, the negative-integral value obtained in step S107 is reset to zero (S109). In the negative-integral calculation process in step S107, information which is more appropriate to the control conditions can be obtained when the integral value of the offset D is zero or negative, as compared to when the integral value of the offset D is positive. Since, in the negative-integral calculation process, the calculation is performed (that is, the integral value is not reset) while the integral value is zero or negative, the integral value obtained while the integral value is positive does not affect the calculation result. Accordingly, if it is determined that the sign of the negative-integral value is positive in step S108, by resetting the negative-integral value to zero, it is made possible to minimize the influence of the information which is not appropriate to the control conditions on the overall control. In this way, it is possible to stably minimize the influence due to disturbance while a steady disturbance is being caused. On the other hand, if it is determined that the negative-integral value is zero or negative in step S108, the negative-integral value is not reset, and the process proceeds to step S110.

Next, one of the positive-integral value obtained in the positive-integral calculation process (S104 to S106) and the negative-integral value obtained in the negative-integral calculation process (S107 to S109), which is appropriate to the control conditions, is selected as the control parameter which is actually used in the subsequent process (S110). The control-parameter selection process will be described in detail later with reference to a flow chart shown in FIGS. 6A and 6B.

Once an integral value is selected in step S110, the steering torque $T_{INT}$ for eliminating the steady-state error caused by disturbance is calculated using the integral value, and the above equation (5), for example (S111). The steering torque $T_R$ for allowing the vehicle 1 to turn along the travel lane 10 (curve) is calculated using the above equation (2), for example (S112).

Next, the steering torque T necessary to the overall steering assist control is calculated using the above equation (1) (S113). The steering torque T is then outputted to the steering mechanism 5 to perform the steering assist control (S114).

Figure 6A:
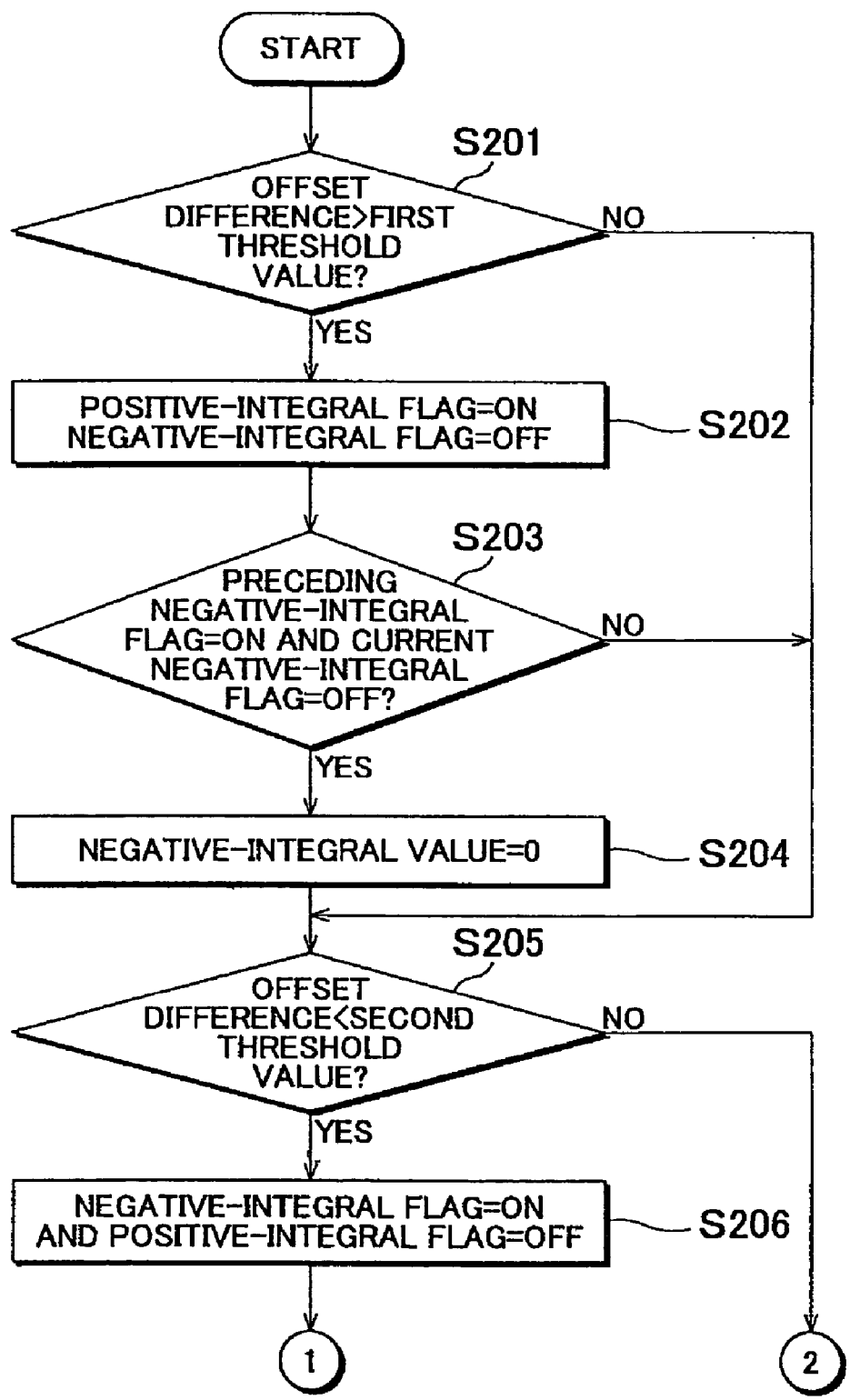
FIGS. 6A and 6B flow charts showing an operation of the servo controller shown in FIG. 1.
Figure 6B:
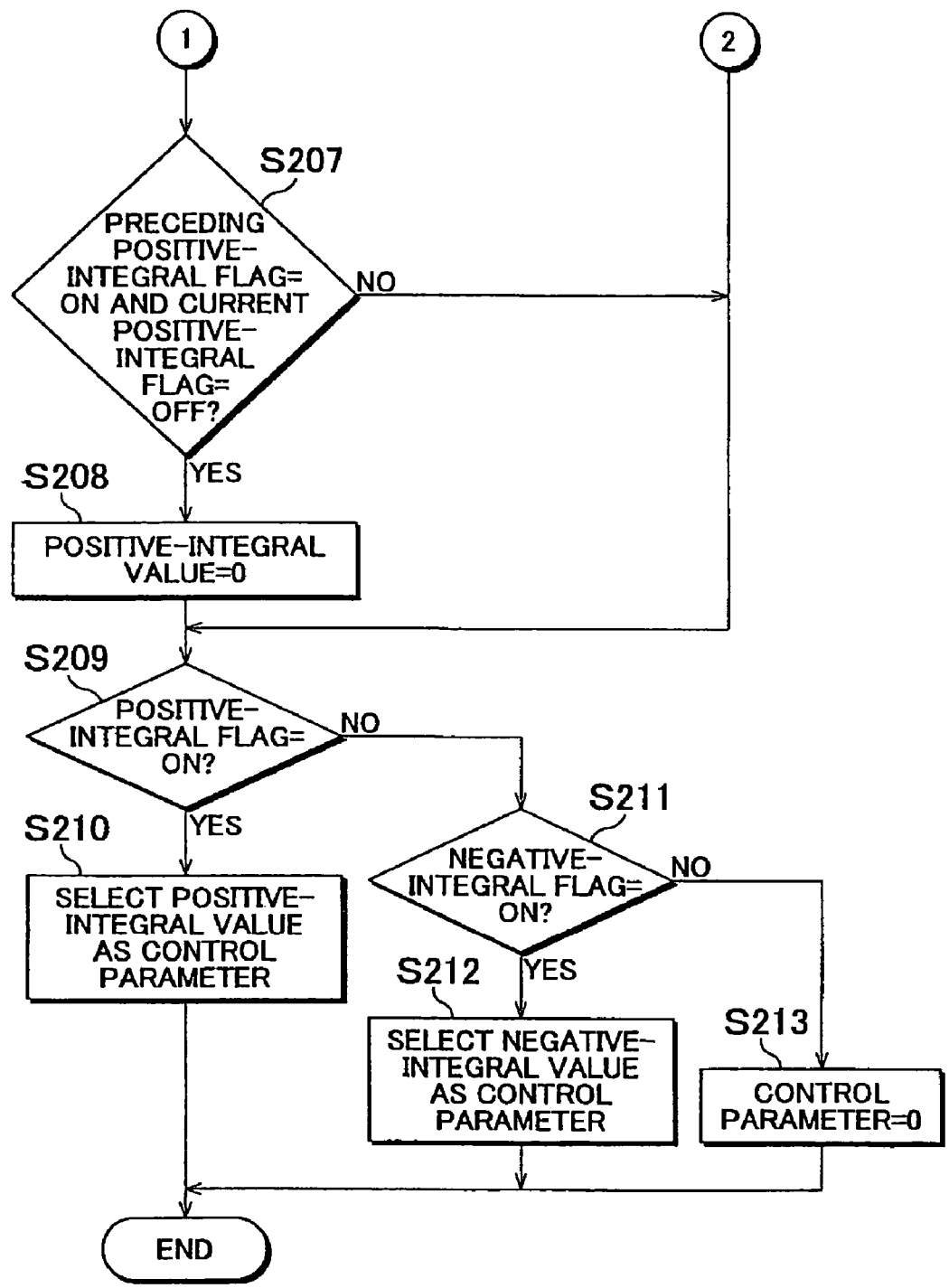

Detailed description will now be given of the control parameter selection process in step S110 with reference to the flow chart shown in FIGS. 6A and 6B. The process shown in FIGS. 6A and 6B are broadly divided into a process of resetting the negative-integral value (S201 to S204), a process of resetting the positive-integral value (S205 to S208), and a process of selecting one value out of the positive-integral value and the negative-integral value as the actual control parameter (S209 to S213). Detailed description will be given below of the processes.

First, determined is whether the difference between the desired position and the actual current position of the vehicle 1 is larger than a predetermined first threshold value (a positive threshold value) (S201). The desired position is equivalent to the desired control value of the steering assist control performed by the steering assist system 1 of this embodiment. For example, the center position of the travel lane is set as the desired position. The actual current position of the vehicle 1 corresponds to the actual control value of the steering assist control. The difference between the desired position and the actual current position of the vehicle 1 can be represented by the distance (deviation) between the desired position and the actual current position of the vehicle 1. The desired position corresponds to the desired steering torque (the steering torque required to allow the vehicle to move to the desired position) which is calculated on the basis of the desired position. The actual current position of the vehicle 1 corresponds to the actual steering torque which has actually been applied in the steering mechanism 5. In this embodiment, the first threshold value is preset at +20 cm, for example.

If it is determined that the difference between the desired position and the actual current position of the vehicle 1 is larger than the first threshold value in step S201, the state of a positive-integral flag is made ON, and the state of a negative-integral flag is made OFF (S202).

Next, determined are whether the state of the negative-integral flag in the preceding control process is ON, and whether the state of the negative-integral flag in the current control process is OFF (S203).

If it is determined that the state of the negative-integral flag in the preceding control process is ON, and that the state of the negative-integral flag in the current control process is OFF, the negative-integral value is reset to zero (S204). It is conceivable that this is a case where the sign of the integral value obtained in the current control process differs from that of the integral value obtained in the preceding control process. In this case, the integral value in the preceding control process (the negative-integral value at this time point) which is the value before the sign of the integral value changes may include the phase delay, which can have an influence on the overall control. For this reason, in this embodiment, the influence of the phase delay of the negative-integral value is inhibited from being exerted on the overall control by resetting the negative-integral value to zero.

On the other hand, if it is determined that the difference between the desired position and the actual current position of the vehicle 1 is not larger than the first threshold value in step S201, the process proceeds to step S205 without resetting the negative-integral value to zero. If, in step S203, it is determined that the state of the negative-integral flag in the preceding control process is OFF, and that the state of the negative-integral flag in the current control process is OFF, the process proceeds to step S205 without resetting the negative-integral value to zero.

Next, determined is whether the difference between the desired position and the actual current position of the vehicle 1 is less than a predetermined second threshold value (a negative threshold value) (S205). In this embodiment, the second threshold value is preset at −20 cm, for example.

If it is determined that the difference between the desired position and the actual current position of the vehicle 1 is less than the second threshold value in step S205, the state of the negative-integral flag is made ON, and the state of the positive-integral flag is made OFF (S206).

Next, determined are whether the state of the positive-integral flag in the preceding control process is ON, and whether the state of the positive-integral flag in the current control process is OFF (S207).

If, in step S207, it is determined that the state of the positive-integral flag in the preceding control process is ON, and that the state of the positive-integral flag in the current control process is OFF, the positive-integral value is reset to zero (S208). It is conceivable that this is a case where the sign of the integral value obtained in the current control process differs from that of the integral value obtained in the preceding control process. In this case, the integral value in the preceding control process (the positive-integral value at this time point) which is the value before the sign of the integral value changes may include the phase delay, which can have an influence on the overall control. For this reason, in this embodiment, the influence of the phase delay of the positive-integral value is inhibited from being exerted on the overall control by resetting the positive-integral value to zero.

On the other hand, if it is determined that the difference between the desired position and the actual current position of the vehicle 1 is not less than the second threshold value in step S205, the process proceeds to step S209 without resetting the positive-integral value to zero. If, in step S207, it is determined that the state of the positive-integral flag in the preceding control process is OFF, and that the state of the positive-integral flag in the current control process is OFF, the process proceeds to step S209 without resetting the positive-integral value to zero.

Next, determined is whether the state of the positive-integral flag is ON (S209). If it is determined that the state of the positive-integral flag is ON in step S209, the positive-integral value is selected as the control parameter (the integral value) which is actually used in the process in step S111 and the subsequent steps shown in FIG. 5B (S210).

On the other hand, if it is determined that the state of the positive-integral flag is not ON in step S209, whether the state of the negative-integral flag is ON is determined (S211). If it is determined that the state of the negative-integral flag is ON in step S211, the negative-integral value is selected as the control parameter (the integral value) which is actually used in the process in step S111 and the subsequent steps shown in FIG. 5B (S212). On the other hand, if it is determined that the state of the negative integral flag is ON in step S211, the vehicle 1 is judged to be at the desired position, for example, and the value of the control parameter which is actually used in the process in step S111 and the subsequent steps shown in FIG. 5B, is reset to zero (S213).

As described above, according to the steering assist system of this embodiment, two integral calculations of the offset D are performed. For example, if the integral value of the offset D in the preceding control process is positive, the positive-integral calculation in the next control process is performed. On the other hand, if the integral value of the offset D in the preceding control process is negative, the negative-integral calculation in the next control process is performed. Thus, differentiated information can be obtained, depending on the sign of the integral value of the offset D, that is, the control conditions.

When performing control so that the actual position of the vehicle 1 in the travel lane 10 coincides with the center position of the travel lane which is the desired position, one of the integral values obtained by the positive-integral calculation and the negative-integral calculation, respectively, is selected on the basis of the actual position and the desired position. For example, while the value of the difference between the actual position and the desired position is positive, the integral value obtained by the positive-integral calculation is selected as the control parameter which is actually used in the subsequent process. On the other hand, while the value of the difference is negative, the integral value obtained by the negative-integral calculation is selected as the control parameter which is actually used in the subsequent process. At this time, the integral value which has not been selected is reset to zero, so that the integral value is surely removed. In this way, even when a steady disturbance is being caused, one of the calculation results obtained by the two integral calculations, which is more appropriate to the control conditions, is selected, so that it is made possible to stably remove the influence of the disturbance.

When, for example, the sign of the control parameter changes from positive to negative, and, therefore, it is determined that the phase delay of the control parameter due to the positive-integral calculation will badly affect the overall control, only the integral value obtained by the negative-integral calculation is selected as the control parameter. At this time, the judgment is made by comparing a threshold value and the difference between a desired position and an actual current position of the vehicle 1. For example, depending on the control conditions, the control parameter which has been judged to include a phase delay is removed (that is, reset to zero), so that the calculation result which has been judged to be more appropriate to the control conditions is selected. In this way, the phase delay due to the positive-integral calculation is removed, and, therefore, the phase delay in the overall control can be suppressed. Similar operations and effects are exhibited also when the sign of the control parameter changes from negative to positive.

Figure 7:
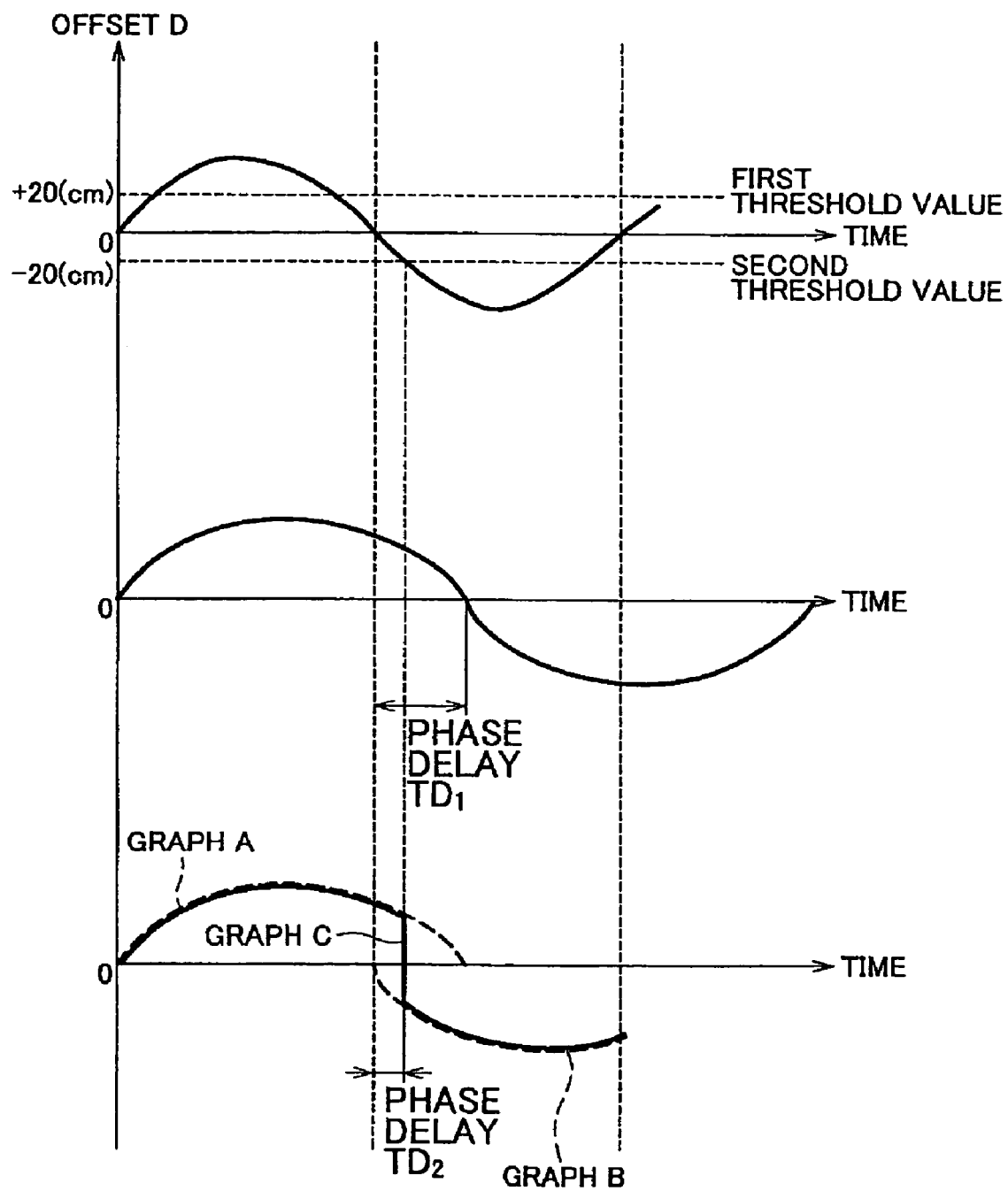
FIG. 7 is a diagram showing that a phase delay is suppressed by using the servo controller shown in FIG. 1.

FIG. 7 shows profiles of the offset D which may appear when the sign of the offset D of the vehicle 1 changes from positive to negative. The top graph of FIG. 7 shows an ideal case where there is no phase delay. The middle graph of FIG. 7 shows a case where there is an influence of the phase delay $TD_1$ as in conventional cases. The bottom graph of FIG. 7 shows a case where the phase delay due to the integral calculation is suppressed by the servo controller of the present invention. In the bottom graph of FIG. 7, the broken line graph A represents the integral value obtained by the positive-integral calculation, and the broken line graph B represents the integral value obtained by the negative-integral calculation. The solid line graph C represents the control parameter selected out of the integral values represented by the graphs A and B, respectively. It can be seen from FIG. 7 that the phase delay $TD_2$ shown in the bottom graph of FIG. 7 has a delay amount less than that of the phase delay $TD_1$ shown in the middle graph of FIG. 7. If the phase delay is suppressed in this way, it is made possible to minimize the influence due to the disturbance caused by steering friction and others. Accordingly, the servo controller according to the present invention can perform an appropriate steering assist control, for example.

While description has been given of a preferred embodiment of the present invention, needless to say, the present invention is not limited to the above-described embodiment.

A servo controller according to the present invention can be used to realize the position control of a robot, for example. For example, the desired control value employed in this case is not limited to the center position of the track, and can be changed depending on the conditions of the position control. Although, in this embodiment, one of the integral values obtained by the positive-integral calculation and the negative-integral calculation, respectively, is selected, both of the integral values may be used by assigning appropriate weights to the values. In addition, the first threshold value and the second threshold value can be changed depending on the conditions of the vehicle and the road.

While the invention has been described with reference to exemplary embodiments thereof, it is to be understood that the invention is not limited to the exemplary embodiments or constructions. To the contrary, the invention is intended to cover various modifications and equivalent arrangements other than described above. In addition, while the various elements of the exemplary embodiments are shown in various combinations and configurations, which are exemplary, other combinations and configurations, including more, less or only a single element, are also within the spirit and scope of the invention.

What is claimed is:

1. A servo controller which repeatedly performs a predetermined control process, and controls a state of a controlled system on the basis of a result of performing the control process, comprising:
 a detector for detecting the state of the controlled system; and
 a control unit which performs:
  a positive-integral calculation in which an integral calculation of a physical quantity representing the state of the controlled system detected by the detector is performed, and in which, when a resulting integral value is positive, the integral calculation is continued, and
  a negative-integral calculation in which an integral calculation of the physical quantity representing the state of the controlled system detected by the detector is performed, and in which, when a resulting integral value is negative, the integral calculation is continued, and
  a selection of which one of the positive-integral calculation and the negative-integral calculation is used when control is performed so that a value representing the state of the controlled system becomes equal to a desired control value, wherein:
 the control unit performs control so that the value representing the state of the controlled system becomes equal to the desired control value, using one of the positive-integral calculation and the negative-integral calculation, which has been selected, and
 the control unit resets the integral value calculated by the positive-integral calculation to zero when the sign of the integral value calculated by the positive-integral calculation is negative, and resets the integral value calculated by the negative-integral calculation to zero when the sign of the integral value calculated by the negative-integral calculation is positive.

2. The servo controller according to claim 1, wherein the control unit makes a selection of which one of the positive-integral calculation and the negative-integral calculation is used, on the basis of an actual control value and the desired control value.

3. The servo controller according to claim 2, wherein the control unit selects the positive-integral calculation when a difference between the actual control value and the desired control value is larger than a predetermined positive threshold value, or selects the negative-integral calculation when the difference is less than a predetermined negative threshold value.

4. The servo controller according to claim 3, wherein the control unit resets the integral value calculated by the negative-integral calculation to zero when the difference is larger than the positive threshold value, and resets the integral value calculated by the positive-integral calculation to zero when the difference is less than the negative threshold value.

5. The servo controller according to claim 1, wherein the control unit resets the integral value calculated by the negative-integral calculation to zero when a difference between the actual control value and the desired control value is larger than a predetermined positive threshold value, or resets the integral value calculated by the positive-integral calculation to zero when the difference is less than a predetermined negative threshold value.

6. A servo controller for assisting steering operation of a vehicle so that the vehicle travels keeping a predetermined position in a travel lane, comprising:
 a detector for detecting an offset, which is a deviation of a position of the vehicle from a desired position in a travel lane; and
 a control unit which performs:
  a positive-integral calculation in which an integral calculation of the offset detected by the detector is performed, and in which, when a resulting offset integral value is positive, the integral calculation is continued, and
  a negative-integral calculation in which an integral calculation of the offset detected by the detector is performed, and in which, when a resulting offset integral value is negative, the integral calculation is continued, and
  a selection of which one of the positive-integral calculation and the negative-integral calculation is used when control is performed so that the position of the vehicle in the travel lane coincides with the desired position, wherein:
 the control unit performs control so that the position of the vehicle in the travel lane coincides with the desired position, using one of the positive-integral calculation and the negative-integral calculation, which has been selected, and
 the control unit resets the offset integral value calculated by the positive-integral calculation to zero when the sign of the offset integral value calculated by the positive-integral calculation is negative, and resets the offset integral value calculated by the negative-integral calculation to zero when the sign of the offset integral value calculated by the negative-integral calculation is positive.

7. The servo controller according to claim 6, wherein the control unit makes a selection of which one of the positive-integral calculation and the negative-integral calculation is used, on the basis of the position of the vehicle in the travel lane and the desired position.

8. The servo controller according to claim 7, wherein the control unit selects the positive-integral calculation when a difference between the position of the vehicle in the travel lane and the desired position is larger than a predetermined positive threshold value, or selects the negative-integral calculation when the difference is less than a predetermined negative threshold value.

9. The servo controller according to claim 8, wherein the control unit resets the offset integral value calculated by the negative-integral calculation to zero when the difference is larger than the positive threshold value, and resets the offset integral value calculated by the positive-integral calculation to zero when the difference is less than the negative threshold value.

10. A control method using a servo controller which repeatedly performs a predetermined control process, and controls a state of a controlled system on the basis of a result of performing the control process, comprising the steps of:
 detecting the state of the controlled system;
 performing a positive-integral calculation in which performed is an integral calculation of a physical quantity representing the state of the controlled system detected, and, when a resulting integral value is positive, the integral calculation is continued;
 performing a negative-integral calculation in which performed is an integral calculation of the physical quantity representing the state of the controlled system detected, and, when a resulting integral value is negative, the integral calculation is continued;
 making a selection of which one of the positive-integral calculation and the negative-integral calculation is used when control is performed so that a value representing the state of the controlled system becomes equal to a desired control value;

performing control so that the value representing the state of the controlled system becomes equal to the desired control value, using one of the integral calculations, which has been selected;

resetting the integral value calculated by the positive-integral calculation to zero when the sign of the integral value calculated by the positive-integral calculation is negative; and resetting the integral value calculated by the negative-integral calculation to zero when the sign of the integral value calculated by the negative-integral calculation is positive.

11. The control method according to claim 10, further comprising the step of:

making a selection of which one of the positive-integral calculation and the negative-integral calculation is used, on the basis of an actual control value and the desired control value.

12. The control method according to claim 11, further comprising the steps of:

selecting the positive-integral calculation when a difference between the actual control value and the desired control value is larger than a predetermined positive threshold value; and selecting the negative-integral calculation when the difference is less than a predetermined negative threshold value.

13. The control method according to claim 12, further comprising the steps of:

resetting the integral value calculated by the negative-integral calculation to zero when the difference is larger than the positive threshold value; and resetting the integral value calculated by the positive-integral calculation to zero when the difference is less than the negative threshold value.

14. The control method according to claim 10, further comprising the steps of:

resetting the integral value calculated by the negative-integral calculation to zero when a difference between the actual control value and the desired control value is larger than a predetermined positive threshold value; or resetting the integral value calculated by the positive-integral calculation to zero when the difference is less than a predetermined negative threshold value.

15. A control method using a servo controller for assisting steering operation of a vehicle so that the vehicle travels keeping a predetermined position in a travel lane, comprising the steps of:

detecting an offset, which is a deviation of a position of the vehicle from a desired position in the travel lane;

performing a positive-integral calculation in which an integral calculation of the offset detected is performed, and in which, when a resulting offset integral value is positive, the integral calculation is continued;

performing a negative-integral calculation in which an integral calculation of the offset detected is performed, and in which, when a resulting offset integral value is negative, the integral calculation is continued;

making a selection of which one of the positive-integral calculation and the negative-integral calculation is used when control is performed so that the position of the vehicle in the travel lane coincides with the desired position;

performing control so that the position of the vehicle in the travel lane coincides with the desired position, using one of the positive-integral calculation and the negative-integral calculation, which has been selected;

resetting the offset integral value calculated by the positive-integral calculation to zero when the sign of the offset integral value calculated by the positive-integral calculation is negative; and resetting the offset integral value calculated by the negative-integral calculation to zero when the sign of the offset integral value calculated by the negative-integral calculation is positive.

16. The control method according to claim 15, further comprising the step of:

making a selection of which one of the positive-integral calculation and the negative-integral calculation is used, on the basis of the position of the vehicle in the travel lane and the desired position.

17. The control method according to claim 16, further comprising the steps of:

selecting the positive-integral calculation when a difference between the position of the vehicle in the travel lane and the desired position is larger than a predetermined positive threshold value; and selecting the negative-integral calculation when the difference is less than a predetermined negative threshold value.

18. The control method according to claim 17, further comprising the steps of:

resetting the offset integral value calculated by the negative-integral calculation to zero when the difference is larger than the positive threshold value; and resetting the offset integral value calculated by the positive-integral calculation to zero when the difference is less than the negative threshold value.

* * * * *